US012598373B2

(12) United States Patent　　　　　(10) Patent No.: US 12,598,373 B2
Chen et al.　　　　　　　　　　　　　(45) Date of Patent: Apr. 7, 2026

(54) VIDEO RECORDING METHOD AND APPARATUS, AND ELECTRONIC DEVICE

(71) Applicant: VIVO MOBILE COMMUNICATION CO., LTD., Guangdong (CN)

(72) Inventors: Zhe Chen, Guangdong (CN); Junjie Li, Guangdong (CN)

(73) Assignee: VIVO MOBILE COMMUNICATION CO., LTD., Guangdong (CN)

(\*) Notice: Subject to any disclaimer, the term of this patent is extended or adjusted under 35 U.S.C. 154(b) by 62 days.

(21) Appl. No.: 18/798,946

(22) Filed: Aug. 9, 2024

(65) Prior Publication Data

US 2024/0406543 A1　　Dec. 5, 2024

Related U.S. Application Data

(63) Continuation of application No. PCT/CN2023/075133, filed on Feb. 9, 2023.

(30) Foreign Application Priority Data

Feb. 10, 2022　(CN) .......................... 202210126659.6

(51) Int. Cl.
　　*H04N 23/63*　　　(2023.01)
　　*G06T 7/50*　　　(2017.01)

(52) U.S. Cl.
　　CPC ............. *H04N 23/632* (2023.01); *G06T 7/50* (2017.01); *G06T 2207/20132* (2013.01)

(58) Field of Classification Search
　　CPC .......... H04M 1/72403; H04M 2250/52; H04N 23/632; H04N 23/635; H04N 23/667;
　　　　　　　　(Continued)

(56) References Cited

U.S. PATENT DOCUMENTS 7,711,258 B2 \* 5/2010 Yanagi ................... G03B 17/04
　　　　　　　　　　　　　　　　396/76
8,823,857 B2 \* 9/2014 Kazama ................. H04N 23/69
　　　　　　　　　　　　　　　　348/333.05
(Continued)

FOREIGN PATENT DOCUMENTS

CN　　112565611 A　　3/2021
CN　　112714255 A　　4/2021
(Continued)

OTHER PUBLICATIONS

First Office Action for Chinese Application No. 202210126659.6, dated Feb. 27, 2024, 12 Pages.
(Continued)

*Primary Examiner* — Pritham D Prabhakher
(74) *Attorney, Agent, or Firm* — BROOKS KUSHMAN P.C.

(57) ABSTRACT

A video recording method and apparatus, and an electronic device. The solution of this application includes: receiving a first input by a user to a shooting preview interface; performing, in response to the first input, recording based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and generating a target video based on the first video and the second video.

18 Claims, 12 Drawing Sheets

(58) Field of Classification Search

CPC ...... H04N 23/631; H04N 23/69; H04N 23/62;
H04N 23/45; H04N 5/772; G06T 7/50;
G06T 2207/20132

USPC ................................................... 348/333.01

See application file for complete search history.

(56) References Cited

U.S. PATENT DOCUMENTS

| | | | | |
|---|---|---|---|---|
| 8,866,943 | B2 * | 10/2014 | Park ..................... | H04N 5/2621 |
| | | | | 348/47 |
| 9,798,464 | B2 * | 10/2017 | Thorne ................. | G06F 3/0482 |
| 11,132,066 | B1 * | 9/2021 | Blachly ................. | G06F 3/0488 |
| 11,706,494 | B2 * | 7/2023 | Sarkar ................ | H04N 21/4316 |
| | | | | 725/10 |
| 11,765,463 | B2 * | 9/2023 | Li ........................ | H04N 23/631 |
| | | | | 348/207.99 |
| 12,375,796 | B2 * | 7/2025 | Bian .................... | G11B 27/105 |
| 2012/0113216 | A1 * | 5/2012 | Seen .................... | H04N 13/286 |
| | | | | 348/47 |
| 2012/0120277 | A1 * | 5/2012 | Tsai ..................... | H04N 23/673 |
| | | | | 348/E9.052 |
| 2012/0268641 | A1 * | 10/2012 | Kazama ................. | H04N 23/45 |
| | | | | 348/E5.051 |
| 2013/0235224 | A1 * | 9/2013 | Park ....................... | H04N 23/64 |
| | | | | 348/E5.024 |
| 2014/0111534 | A1 | 4/2014 | Niles et al. | |
| 2015/0237268 | A1 * | 8/2015 | Vaiaoga ................. | H04N 23/90 |
| | | | | 348/218.1 |
| 2015/0326793 | A1 * | 11/2015 | Mäkinen ................ | H04N 23/69 |
| | | | | 348/240.99 |
| 2016/0044235 | A1 * | 2/2016 | Cho ..................... | H04M 1/0264 |
| | | | | 348/333.05 |
| 2016/0283106 | A1 * | 9/2016 | Thorne .................. | H04N 23/66 |
| 2020/0036892 | A1 * | 1/2020 | Araumi .................. | H04N 23/63 |
| 2020/0275159 | A1 * | 8/2020 | Sarkar ................ | H04N 21/2541 |
| 2022/0159183 | A1 | 5/2022 | Li et al. | |
| 2023/0115929 | A1 | 4/2023 | Bian et al. | |
| 2023/0171459 | A1 * | 6/2023 | Chen ..................... | H04N 21/242 |
| | | | | 348/515 |

FOREIGN PATENT DOCUMENTS

| | | |
|---|---|---|
| CN | 112954193 A | 6/2021 |
| CN | 112954218 A | 6/2021 |
| CN | 112954219 A | 6/2021 |
| CN | 113014801 A | 6/2021 |
| CN | 113365012 A | 9/2021 |
| CN | 113572954 A | 10/2021 |
| CN | 113873151 A | 12/2021 |
| CN | 114025237 A | 2/2022 |
| CN | 114520877 A | 5/2022 |
| EP | 3833002 A1 | 6/2021 |

OTHER PUBLICATIONS

International Search Report and Written Opinion for Application No. PCT/CN2023/075133, dated May 12, 2023, 16 Pages.
Extended European Search Report for Application No. 23752391.5, dated Mar. 26, 2025, 8 Pages.

* cited by examiner

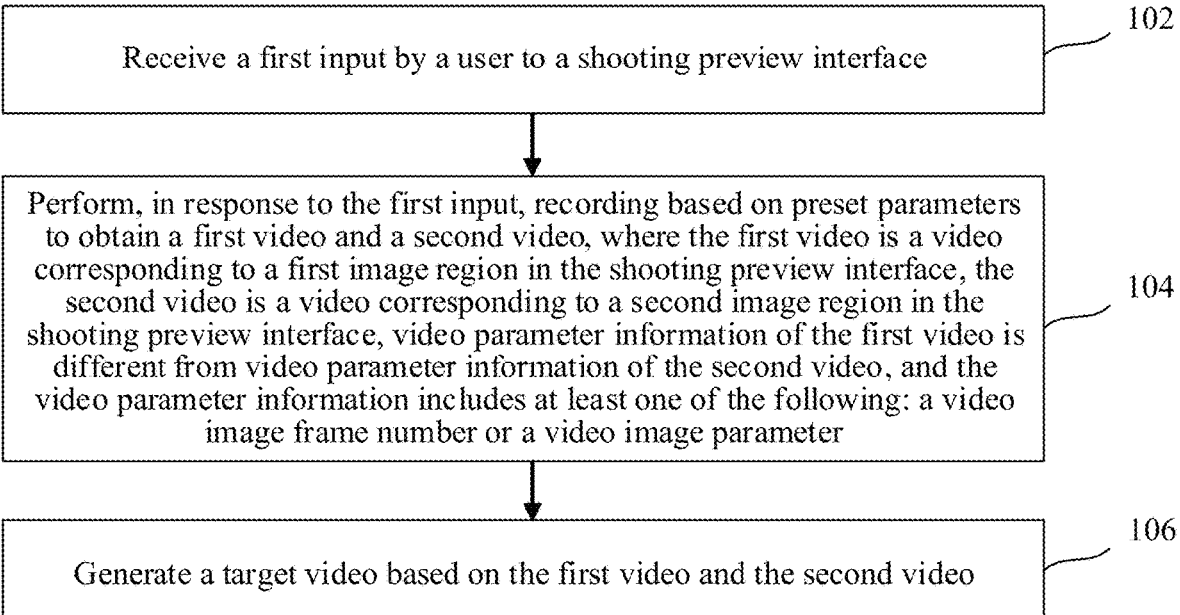

102

Receive a first input by a user to a shooting preview interface

104

Perform, in response to the first input, recording based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter

106

Generate a target video based on the first video and the second video

FIG. 1

Video image frame D       Video image frame E

Crop                Crop c                    d

←Align→

Composite

800

900

VIDEO RECORDING METHOD AND APPARATUS, AND ELECTRONIC DEVICE

CROSS-REFERENCE TO RELATED APPLICATIONS

This application is a continuation of International Application No. PCT/CN2023/075133 filed on Feb. 9, 2023, which claims priority to Chinese Patent Application No. 202210126659.6 filed on Feb. 10, 2022, which are incorporated herein by reference in their entireties.

TECHNICAL FIELD

This application relates to the field of photographing technologies, and specifically, to a video recording method and apparatus, and an electronic device.

BACKGROUND

In recent years, short video recording has become a very popular direction. A user has an increasing demand for a video recording function of a terminal device, and has put forward a higher requirement for video recording and editing functions. Currently, creation of a short video usually requires two main processes: pre-video recording and post-editing. Generally, the user needs to perform complex operations such as cutout, editing, and composition on a plurality of videos. The operations are complex and the creation difficulty is high. In addition, it is difficult to ensure uniformity of an environment such as lighting due to a plurality of times of recording, resulting in a low video creation rate.

SUMMARY

According to a first aspect, an embodiment of this application provides a video recording method, including:

receiving a first input by a user to a shooting preview interface;

performing, in response to the first input, recording based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and generating a target video based on the first video and the second video.

According to a second aspect, an embodiment of this application provides a video recording apparatus, including:

a first receiving module, configured to receive a first input by a user to a shooting preview interface;

a recording module, configured to perform, in response to the first input, recording based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and a generation module, configured to generate a target video based on the first video and the second video.

According to a third aspect, an embodiment of this application provides an electronic device, including a processor, a memory, and a program or instructions stored on the memory and runnable on the processor, where the program or the instructions, when executed by the processor, implement steps of the method according to the first aspect.

According to a fourth aspect, an embodiment of this application provides a readable storage medium, storing a program or instructions, where the program or the instructions, when executed by the processor, implement steps of the method according to the first aspect.

According to a fifth aspect, an embodiment of this application provides a chip, including a processor and a communication interface, where the communication interface is coupled to the processor, and the processor is configured to run a program or instructions, to implement the method according to the first aspect.

According to a sixth aspect, an embodiment of this application provides a computer program product, stored in a storage medium, where the program product, when executed by at least one processor, implements the method according to the first aspect.

BRIEF DESCRIPTION OF THE DRAWINGS

FIG. 1 is a schematic flowchart of a video recording method according to an embodiment of this application;

DETAILED DESCRIPTION

Figure 2A:
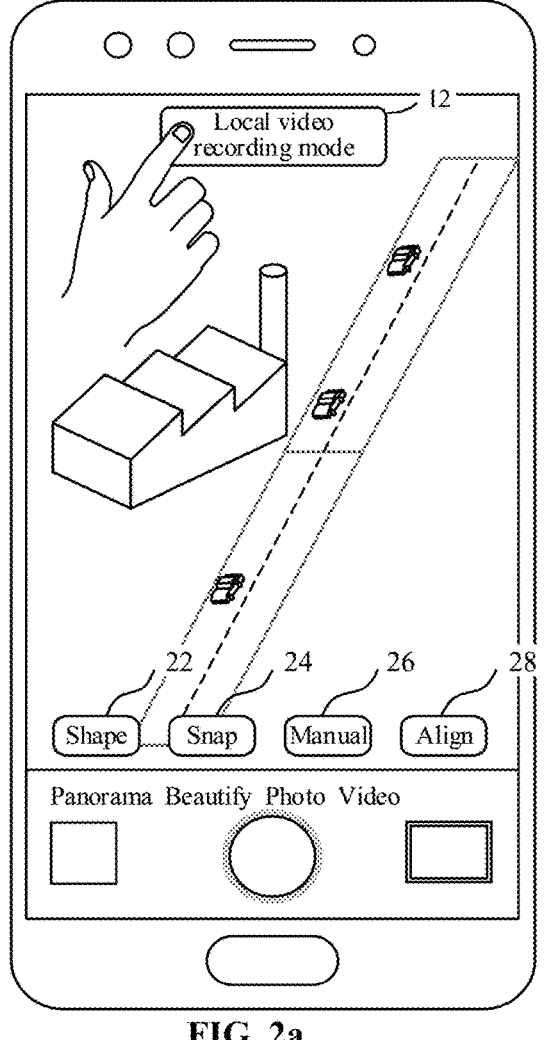
FIG. 2a to FIG. 2f are schematic diagrams of user interfaces for image region division according to an embodiment of this application.

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

In the specification and claims of this application, terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" means at least one of the connected objects, and the character "/" generally indicates an "or" relationship between the associated objects.

A video recording method provided in the embodiments of this application is described below through specific embodiments and application scenarios thereof with reference to the accompanying drawings.

In an embodiment of this application, a video recording method is provided. The method may be applied to a terminal device having a camera for video recording, including a mobile electronic device and a non-mobile electronic device.

FIG. 1 is a schematic flowchart of video recording according to an embodiment of this application. As shown in FIG. 1, the video recording in this embodiment of this application may include the following step 102 to step 106.

Step 102: Receive a first input by a user to a shooting preview interface.

The first input may be an input by the user to click a shooting control displayed in the shooting preview interface. In this embodiment of this application, the click input may be a single click input, a double click input, an input with any number of click, or the like; or may be a long-press input or a short-press input.

The shooting preview interface is a preview picture corresponding to a target field of view range. The target field of view range is a same field of view range, where a location of a camera of a terminal device is fixed. When an interface corresponding to a video recording mode of the terminal device is entered and the camera of the terminal device faces a region, the preview picture that can be captured in the field of view range may be obtained. The preview picture may include a still shot object or a moving shot object. For example, if the camera needs to record a seaside road in a fixed field of view range, still objects in the preview picture include sea, sky, and the road, and moving objects include various moving vehicles or pedestrians or the like. In this way, a location, a shape, and a size of the still object are fixed in a recorded video with predetermined duration.

Step 104: Perform, in response to the first input, recording based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter.

The first image region and the second image region are different regions in the shooting preview interface, and division may be performed based on preset shape inputs. A video recording parameter corresponding to each image region may be the same or different. In this embodiment of this application, the video parameter information of the first video obtained by recording the first image region based on the preset parameters is different from the video parameter information of the second video obtained by recording the second image region based on the preset parameters. Video parameter information corresponding to a video is determined based on a preset recording parameter of a corresponding image region, which is described below in detail.

Step 106: Generate a target video based on the first video and the second video.

Optionally, before the receiving a first input by a user to a shooting preview interface, the method further includes: receiving a second input by the user to the shooting preview interface; and determining, in response to the second input, the first image region and the second image region in the shooting preview interface.

In this step, the shooting preview interface is divided into a plurality of image regions.

In an embodiment of this application, the first image region and the second image region in the shooting preview interface are still regions. When the shooting preview interface includes a still object and a moving object, the first image region and the second image region are still objects, for example, the foregoing sea, sky, and road.

In other embodiments, the first image region and the second image region in the shooting preview interface may alternatively be dynamic regions corresponding to moving objects, for example, the foregoing moving vehicles or pedestrians.

Optionally, the second input includes a first sub-input and a second sub-input, and the receiving a second input by the user to the shooting preview interface includes: receiving the first sub-input by the user to a shape control in the shooting preview interface; and the determining, in response to the second input, the first image region and the second image region in the shooting preview interface includes: displaying at least one candidate shape in response to the first sub-input; receiving the second sub-input by the user to a target candidate shape in the at least one candidate shape; and determining, in response to the second sub-input, the first image region and the second image region based on the target candidate shape.

The first sub-input may be a click input to the shape control in the shooting preview interface. The shape control in the shooting preview interface may include various preset shapes, such as a rectangle, a circle, and a triangle. Through the first sub-input, the various shapes included in the shape control may be displayed in the shooting preview interface.

The second sub-input may be a click input to the target candidate shape. Through the click input, the target candidate shape is used as a shape for dividing the shooting preview interface into the plurality of image regions. For example, a region surrounded by the target candidate shape is determined as the first image region, and a region outside the target candidate shape, that is, a region other than the first image region in the shooting preview interface, is determined as the second image region.

Optionally, after the receiving the second sub-input by the user to a target candidate shape in the at least one candidate shape, the method further includes: receiving a third input by the user; and displaying, in response to the third input, the target candidate shape in a target region of the shooting preview interface, where a shape of a target object in the target region is adapted to the target candidate shape.

In this embodiment, the third input may be an input to a snap control in the shooting preview interface; or may refer to clicking a target object in the shooting preview interface for automatic snapping. In this way, the target candidate shape is adapted to a shape of the target object in the shooting preview interface and displayed.

Optionally, after the displaying the target candidate shape in a target region of the shooting preview interface, the method further includes: receiving a fourth input by the user to the target candidate shape; and updating display information of the target candidate shape in response to the fourth input, wherein the display information includes at least one of the following: location information or size information.

In this embodiment, the fourth input may be an adjustment operation for the target candidate shape displayed in the shooting preview interface. For example, if the target candidate shape is a parallelogram, a location, a size, and the like of the parallelogram are adjusted and updated through the fourth input, so that the updated shape is consistent with the shape of the target object, thereby achieving accurate adaptation.

In this way, when image region division is inaccurate due to inaccurate adaptation between the target candidate shape and the shape of the target object, the user may further manually adjust the target candidate shape that is for dividing image regions.

Optionally, the receiving a second input by the user to the shooting preview interface includes: receiving the second input by the user to a first target object in the shooting preview interface; and the determining, in response to the second input, the first image region and the second image region in the shooting preview interface includes: determining, in response to the second input, the first image region and the second image region based on an image region of the first target object.

In this embodiment, based on an image region corresponding to a target object in the shooting preview interface, the shooting preview interface may be divided into a plurality of image regions.

For example, a shape of a road is approximately a parallelogram, and a shape of a house may also be clearly defined. Shapes of corresponding sky and sea may be determined based on a corresponding intersection line as an edge, but the remaining edge may not be clear.

In this way, an image region of a target object with clear shape edges is determined as the first image region, and a region other than the first image region in the shooting preview interface is determined as the second image region. If the shooting preview interface includes a plurality of target objects, the first image region is determined based on an image region of each target object, to correspondingly obtain a plurality of first image regions.

The foregoing step may be automatically performed by a back-end processor of the terminal device. In an embodiment, a user operation interface may also be provided, to implement image region division in the shooting preview interface based on a user operation and automatic processing by the terminal device.

FIG. 2a to FIG. 2f are schematic diagrams of user interfaces for image region division according to an embodiment of this application. In this embodiment, an example in which the terminal device is a mobile phone is used for description.

FIG. 2a shows a user interface corresponding to entering a video recording mode of the mobile phone. In the figure, a "local recording mode" indicates the video recording mode in this embodiment of this application, to emphasize that video recording in this application is video recording based on a plurality of image regions obtained through division.

As shown in FIG. 2a, in a video recording interface of a camera of the mobile phone, the "local video recording mode" is entered by clicking a control 12 at the top of a screen. In this case, four controls, namely, a "shape" control 22, a "snap" control 24, a "manual" control 26, and an "alignment" control 28, appear at the bottom of the screen of the mobile phone, to facilitate the user to obtain a local region accurately and quickly. Functions of the four controls are as follows.

Shape: Series of shapes are provided, and the user may select a graphic most similar to the local region to quickly determine an image region.

Snap: Quickly match a selected shape to an edge of each image region by using graphic edge recognition and segmentation technologies.

Manual: Provide an operation manner in which the user manually adjusts an image region.

Align: Set a time alignment manner of videos in different image regions.

Figure 2B:
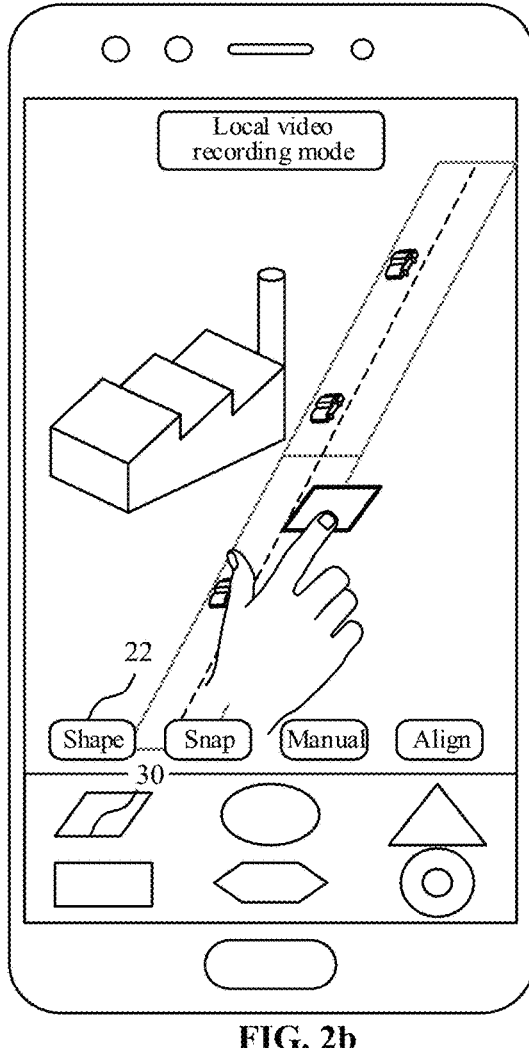

FIG. 2b shows a user interface for selecting a corresponding shape of the local region. When the "shape" control 22 displayed on the screen of the mobile phone is clicked, various candidate shapes provided by default appear at the bottom of the screen, and one or more candidate shapes may be dragged to the preview interface. For example, a road 30 needs to be used as an image region for local video recording. As shown in FIG. 2b, a shape of a parallelogram may be selected and dragged to the preview interface, and a size of the shape is adjusted, so that the shape roughly matches the region of the road.

Figure 2C:
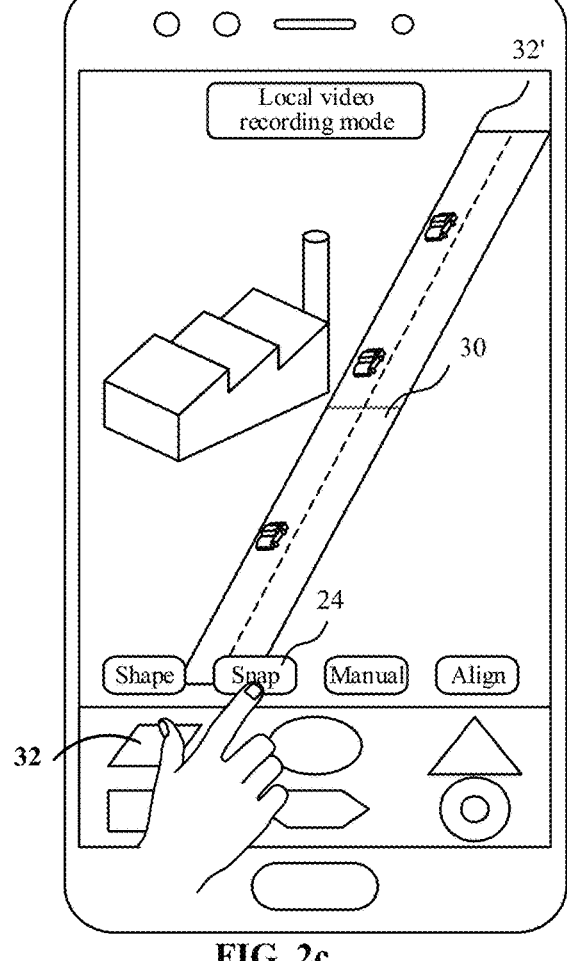

FIG. 2c shows a user interface in which the selected shape is automatically snapped to an edge of the image region. After the user selects any candidate shape in the preview interface and clicks the "snap" control 24, edge recognition is performed on a selected target shape based on information about an image around the preview interface, and the shape is snapped to a recognized edge of the image region. As shown in FIG. 2c, for example, the road 30 needs to be used as an image region for local video recording. After a parallelogram shape 32 in the preview interface is selected and the snap is clicked, a graphic edge near the parallelogram (the edge of the corresponding region of the road 30) is recognized through a graphic edge recognition algorithm, thereby snapping a parallelogram 32' to the edge of the road 30.

Figure 2D:
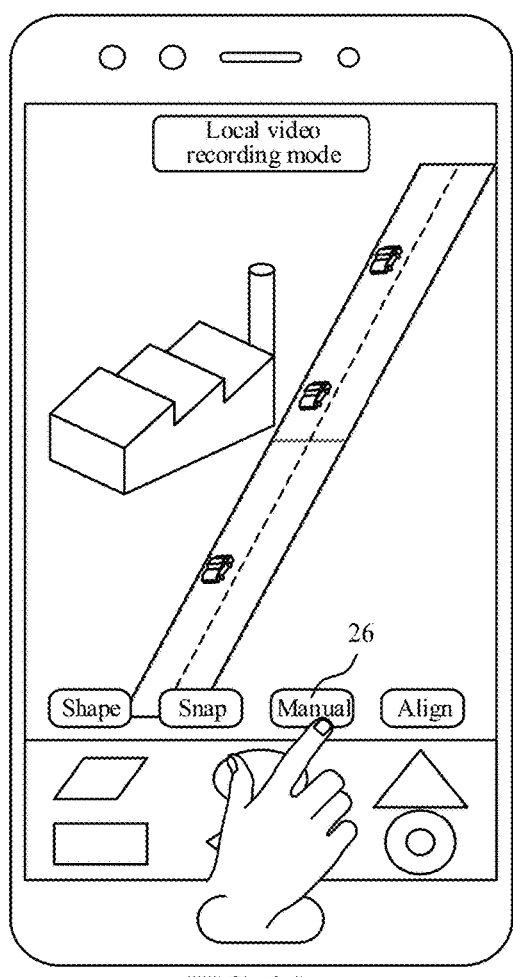
Figure 2E:
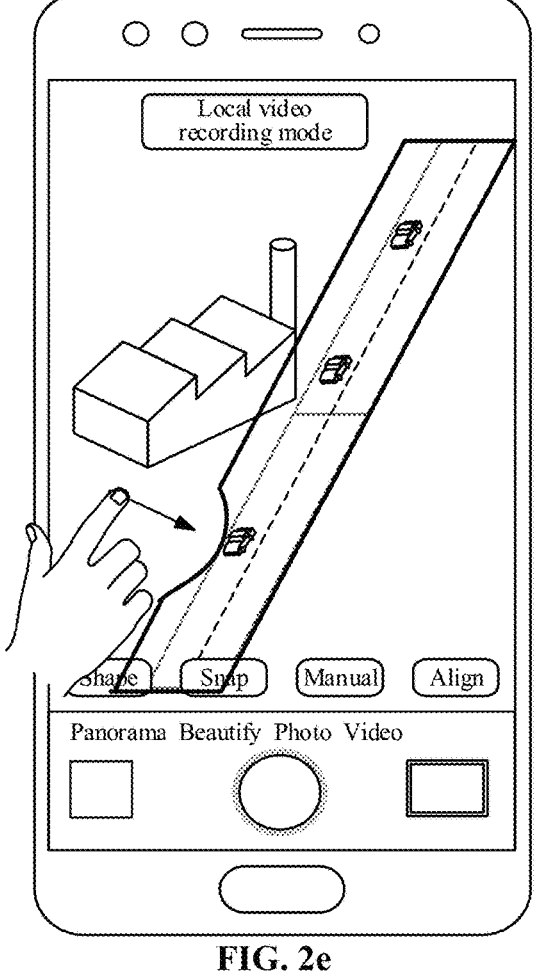
Figure 2F:
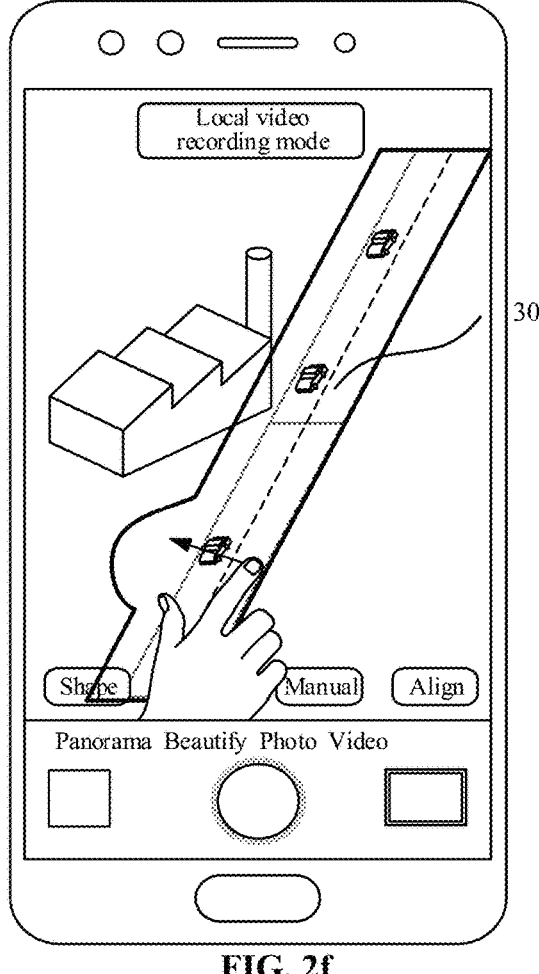

FIG. 2d shows a user interface for the user to manually adjust an edge of a local video recording region. If the user is not satisfied with the shape, the user may select any shape in the preview interface and click the "manual" control 26. In this case, when a finger slides from the outside to the shape, the edge of the shape may be moved inward, as shown in a direction of an arrow in FIG. 2e; and when the finger slides from the shape to the outside, the edge of the shape may be moved outward, as shown in a direction of an arrow in FIG. 2f. For example, the road 30 needs to be used as the local video recording region. If an automatic snapping effect is not satisfactory, the edge of the local region may be manually adjusted to make the shape of the local region obtained through division more accurate.

Optionally, before the receiving a first input by a user to a shooting preview interface, the method further includes: receiving a fifth input by the user to a first target image region; and displaying a frame rate setting window in response to the fifth input, where the frame rate setting window is for setting a recording frame rate of the first target image region; and the first target image region includes at least one of the following: the first image region or the second image region.

In this embodiment, before video recording, a recording frame rate needs to be preset. The recording frame rate is set by using video playback speed. For example, if a frame rate of 1× speed corresponding to an ordinary video is 30 fps/s, 30× speed is 1/30 of the frame rate of 1× speed, and 480× speed is 1/480 of the video frame rate of 1× speed. A frame rate is an actual video image frame number output by the camera per second. If the frame rate is less than that of 1× speed, a slow-motion shooting effect is presented; and if the frame rate is greater than that of 1× speed, a time-lapse shooting effect is presented.

Figure 3:
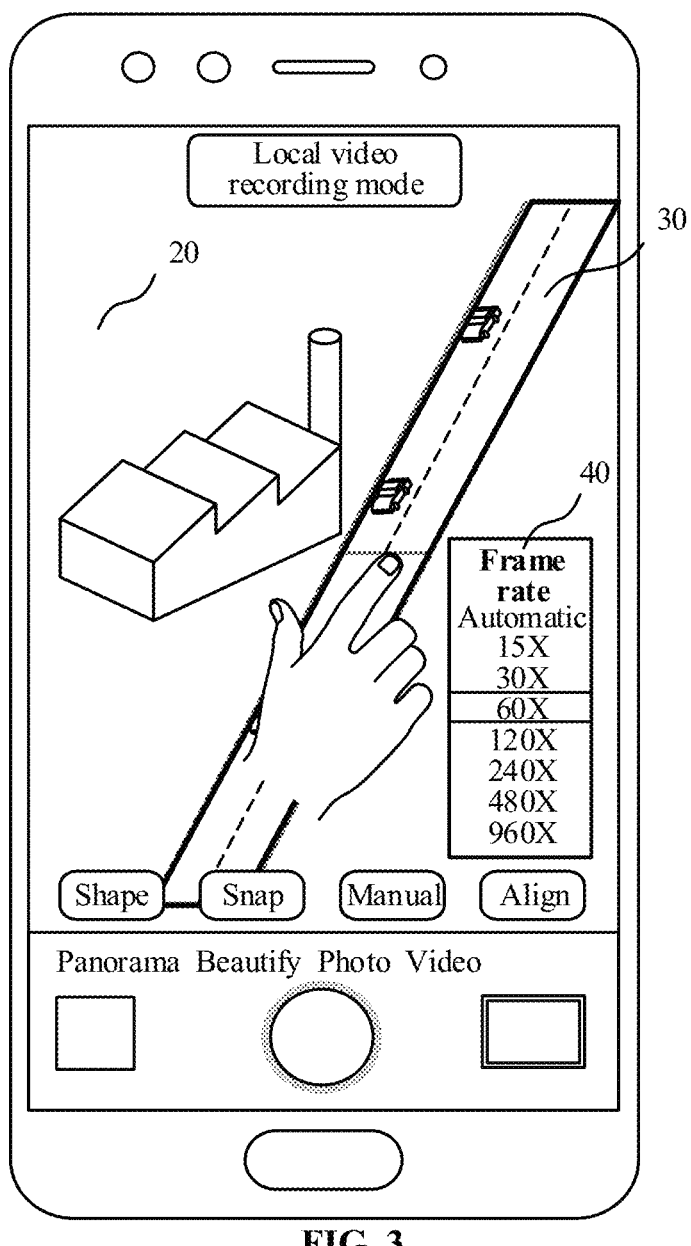
FIG. 3 is a schematic diagram of a user interface for setting a video recording frame rate of an image region according to an embodiment of this application.

FIG. 3 is a schematic diagram of a user interface for setting a video recording frame rate of an image region according to an embodiment of this application. As shown in FIG. 3, if any shape in the preview interface is clicked, a frame rate setting window 40 is displayed on a right side of the shooting preview interface. There are a plurality of frame rates for the user to select in the window, so that a recording frame rate of an image region in the shape can be set. For example, a current video has two image regions: sky 20 and a road 30. An image region corresponding to the sky 20 may be selected, and a frame rate may be set to correspond to 480× speed; or an image region corresponding to the road 30 may be selected, and a frame rate may be set to correspond to 30× speed.

In an embodiment, video recording is performed through a single camera.

Optionally, in step 104, the performing recording based on preset parameters to obtain a first video and a second video includes: controlling a first camera to acquire a first pre-recorded video; and cropping a first target video frame in the first pre-recorded video based on the preset parameters, the first image region, and the second image region, to obtain the first video and the second video, where a video image frame number of the first video is different from a video image frame number of the second video.

In this embodiment, through one camera, video recording is performed based on preset recording frame rates corresponding to different image regions, to correspondingly obtain videos corresponding to the image regions. For each image region, a video frame corresponding to the image region in the recording process is obtained based on a corresponding recording frame rate, and a plurality of frames of images in the video frame are cropped based on a shape of the image region, to obtain a recorded video corresponding to the image region.

Because the recording frame rates of the image regions are different, video image frame numbers of the image regions recorded by the camera are different, that is, duration of the corresponding recorded videos is different.

If a video recording control displayed in an interface of the terminal device is clicked, image data is acquired based on a highest frame rate set in all image regions. For each image region, frame extraction at different intervals is performed on the image data based on a correspondence between the frame rate set for the image region and the highest frame rate. Two image regions in which the sky is recorded at 480× speed and the road is recorded at 30× speed are used as an example. An image sensor acquires image data at 480× speed and at 30× speed corresponding to a highest frame rate in 30× speed for the road. For the region of the road, the image data output by the image sensor is directly used, to obtain a recorded 30×-speed time-lapse video. For the region of the sky, based on the image data output by the image sensor, one frame is extracted every 16 frames, to obtain a recorded 480×-speed time-lapse video.

Alternatively, the image sensor performs shooting in a normal mode at 1× speed of the ordinary video, and acquires a plurality of frames of video images. In this case, for each image region, corresponding images are extracted from the video image frames output by the image sensor based on a set frame rate, to obtain a video corresponding to the image region. For example, 30× speed requires extracting one frame of video image every 30 frames from the acquired images, and 480× speed requires extracting one frame of video image every 480 frames from the acquired images.

In an embodiment, video recording is performed through a plurality of different cameras simultaneously included in the terminal device.

Optionally, before the receiving a first input by a user to a shooting preview interface, the method further includes: receiving a sixth input by the user to a second target image region; and displaying a video recording mode window in response to the sixth input, where the video recording mode window is for setting a video recording mode of the second target image region; and the second target image region includes at least one of the following: the first image region or the second image region.

In this embodiment, before performing video recording through the plurality of different cameras, video recording modes corresponding to the cameras are set. The video recording modes include, for example, time-lapse photography, slow motion, super night scene, and time slow shutter. Different video recording modes are executed by different cameras respectively.

Figure 4:
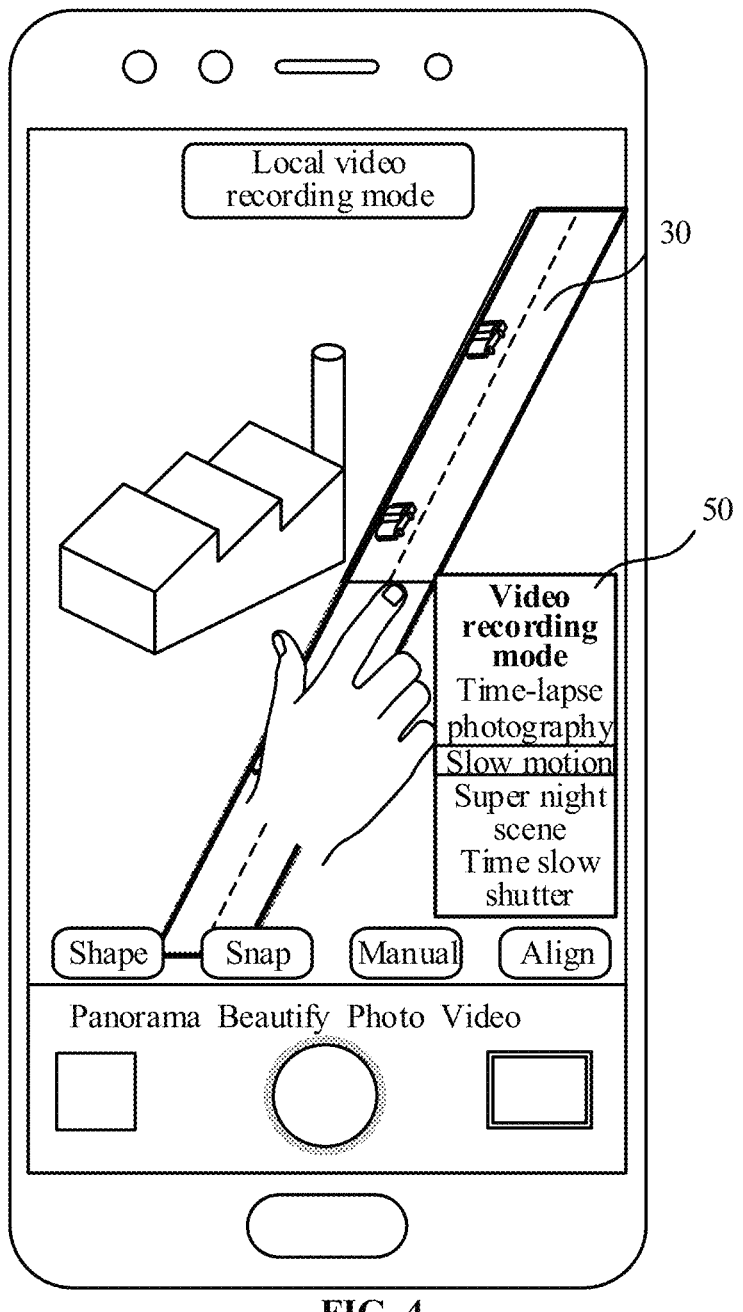
FIG. 4 is a schematic diagram of a user interface for setting a video recording mode of an image region according to an embodiment of this application.

FIG. 4 is a schematic diagram of a user interface for setting a video recording mode of an image region according to an embodiment of this application. As shown in FIG. 4, if a target image region, for example, the road 30, set in the shooting preview interface is long-pressed, a video recording mode window 50 may be displayed on a right side of the shooting preview interface. There are a plurality of video recording modes for the user to select in the window, so that the user selects different video recording modes from a video recording mode list displayed in the interface. When the video recording mode is the super night scene, only one image may be shot when a corresponding camera records a video.

Optionally, in step 104, the performing recording based on preset parameters to obtain a first video and a second video includes: controlling a second camera to acquire a second pre-recorded video in a first video recording mode, and controlling a third camera to acquire a third pre-recorded video in a second video recording mode; cropping a second target video frame in the second pre-recorded video based on the first image region, to obtain the first video; and cropping a third target video frame in the third pre-recorded video based on the second image region, to obtain the second video, where a video image parameter of the first video is different from a video image parameter of the second video.

In this embodiment, different cameras may perform video recording for different image regions in different video recording modes.

A video recording control in a recording interface of the terminal device is clicked, and based on selected video recording modes, different cameras are used to start video recording in corresponding video recording modes, to obtain a plurality of videos corresponding to different video recording modes. Based on set shapes of image regions, a plurality of image frames of pre-recorded videos acquired by the corresponding cameras are cropped, to obtain videos of a plurality of image regions corresponding to different video recording modes.

Because the video recording modes of the image regions are different, video image parameters of the image regions recorded by the corresponding cameras are different. It should be pointed out that, in different video recording modes, different recording parameters corresponding to each video recording mode may also be adjusted, for example, a beautification parameter, a filter parameter, and/or the like in the time-lapse mode may be set at the same time, to implement video recording for the corresponding image regions by implementing different video recording modes and different recording parameters, so that a final video presents a video playback effect with different image modes and recording parameters in the image regions. Optionally, before the receiving a first input by a user to a shooting preview interface, the method further includes: receiving a seventh input by the user to the shooting preview interface; and displaying a first alignment window in response to the seventh input, where the first alignment window is for setting a video image frame alignment manner of the first video and the second video.

In this embodiment, a time alignment manner may be preset before the user performs video recording. By presetting time alignment, recorded videos corresponding to the image regions may be synthesized based on such a presetting, to generate a target video for playback.

In this embodiment of this application, the time alignment manner may include any one of the following:

(1) Start point alignment: All local region videos are played immediately after the videos are opened, duration of a longest local region video is used as duration of a final video, and a last frame of picture remains displayed after a shorter local region video is played, to ensure integrity of pictures in a field of view range during playback of the final video.

(2) End alignment: When a final video is opened, a longest local region video starts to be played, and a first frame of picture of a shorter local region video is displayed for a period of time before the video starts to be played, to ensure that all local region videos end at a same time point.

(3) Middle alignment: Local region videos are aligned based on centers of duration. Other than a longest local region video, first frames of pictures of the remaining local region videos are displayed for a period of time, and last frames of pictures are displayed for a period of time at the end.

Figure 5:
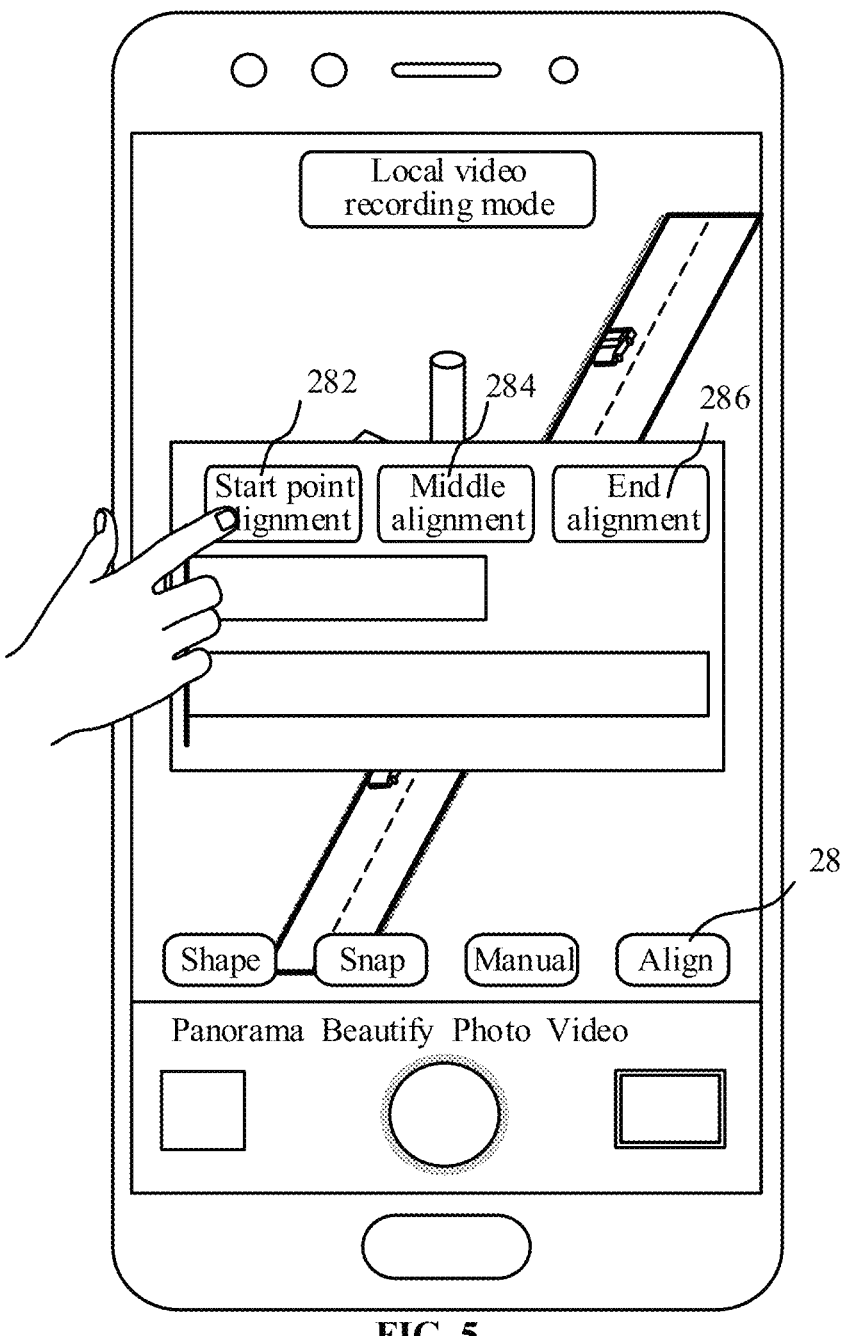
FIG. 5 is a schematic diagram of a user interface for setting a video composition manner corresponding to image regions according to an embodiment of this application.

FIG. 5 is a schematic diagram of a user interface for setting a time alignment manner according to an embodiment of this application. If the "align" control 28 at the bottom of the preview interface is clicked, controls of three time alignment manners are displayed in the shooting preview interface, and include a "start point alignment" control 282, a "middle alignment" control 284, and an "end alignment" control 286. The user may select one of the three time alignment manners: the start point alignment, the middle alignment, or the end alignment; or the start point alignment may be default, as shown in FIG. 5.

The recording frame rates set for the image regions with various shapes are different, and video image frame numbers obtained through corresponding recording by using different frame rates are different due to frame extraction. Therefore, when recorded videos of the image regions are played at a normal frame rate, playback duration of a video with a small frame number is shorter than that of a video with a large frame number. In this way, when a final video is generated, it is necessary to determine playback time points of the videos corresponding to the shapes of the image regions.

In another embodiment, the time alignment manner may alternatively be set by the user after video recording.

Optionally, before the generating a target video based on the first video and the second video, the method further includes: displaying a second alignment window, where the second alignment window includes a first sign and a second sign, the first sign indicates playback duration of the first video, and the second sign indicates playback duration of the second video; receiving an eighth input by the user to a target sign, where the target sign includes at least one of the following: the first sign or the second sign; and updating, in response to the eighth input, relative location information between the first sign and the second sign, where the relative location information indicates relative playback time of the first video and the second video.

Figure 6:
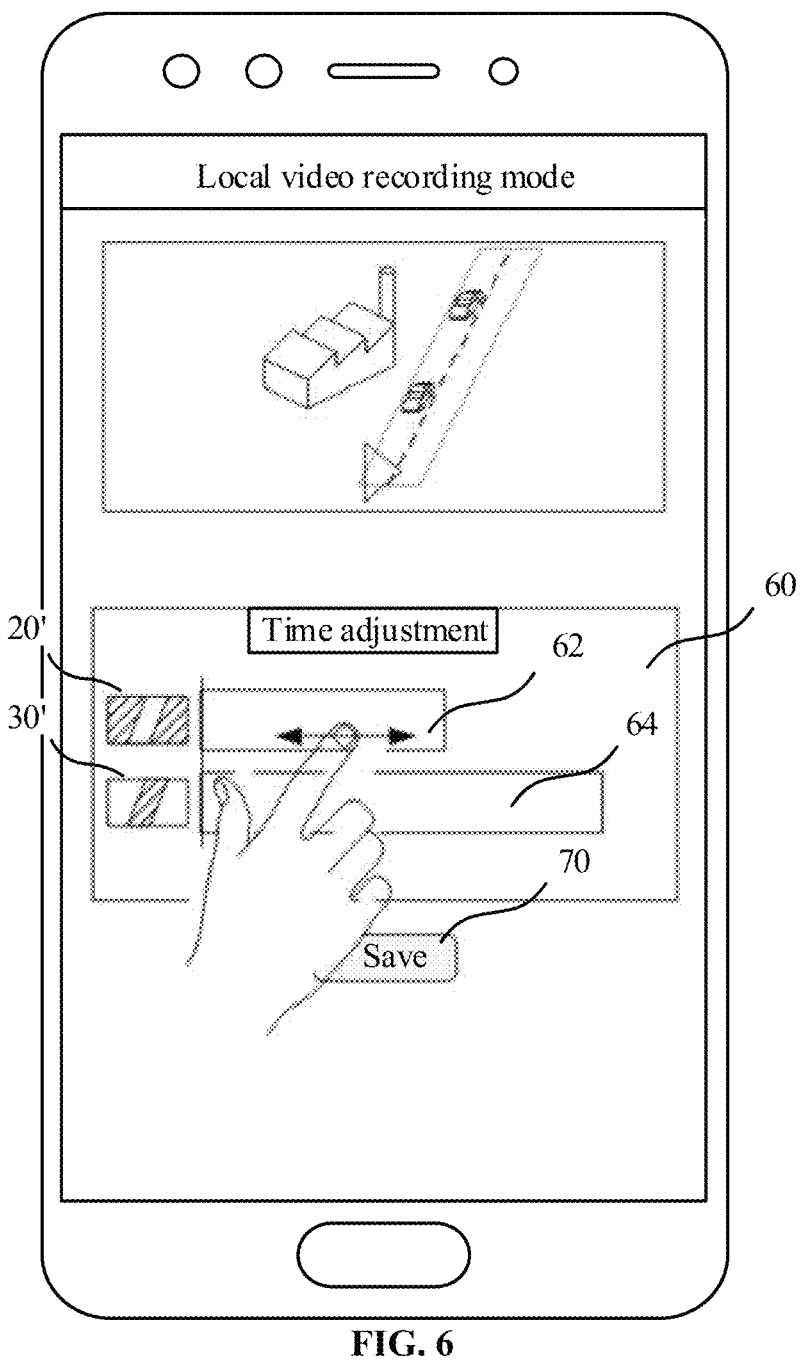
FIG. 6 is a schematic diagram of a user interface for setting a video composition manner corresponding to image regions according to another embodiment of this application.

FIG. 6 is a schematic diagram of a user interface for setting a time alignment manner according to another embodiment of this application.

In this embodiment, after video recording is stopped, a time alignment interface corresponding to videos of image regions may be entered, for example, a time adjustment window 60 shown in FIG. 6. In the embodiment shown in FIG. 6, there are two image regions: sky and a road, and corresponding recorded videos include a video A and a video B. In this case, the videos corresponding to the shapes of the image regions are displayed from top to bottom through rectangular controls 62 and 64. A longer control indicates longer video playback duration. Corresponding shape sketches can be seen on a left side of the screen, and include a shape sketch 20' indicating the sky and a shape sketch 30' indicating the road. The user may drag the rectangular control indicating the shape, to control time alignment of the video. By clicking a video preview picture above, a current video playback effect may be viewed. By clicking a "save" control 70 below, a final time-aligned video is generated.

For example, if the sky is recorded in the time-lapse photography mode, and the road is recorded in the slow-motion mode, duration of the recorded video A of the image region of the sky is short, and duration of the recorded video B of the image region of the road is long. As shown in FIG. 6, the rectangular control indicating the video A of the image region of the sky is dragged to the right, to adjust a relative location between the rectangular control indicating the video A of the image region of the sky and the rectangular control indicating the video B of the image region of the road, to indicate that the video A of the image region of the sky is played later than the video B of the image region of the road.

In this embodiment, the time alignment may be set as alignment at any time point. Therefore, a more delicate time alignment adjustment manner can be implemented.

Specifically, after the corresponding time alignment manner is set based on any of the foregoing embodiments, the videos of the image regions may be synthesized based on the corresponding preset time alignment manners, to generate the target video.

When the time alignment manner is the start point alignment, based on a corresponding time sequence, video image frames of the second video are synthesized in a one-to-one correspondence with video image frames of the first video corresponding to a first frame number; and a last frame of video image of the second video is synthesized with each of video image frames of the first video corresponding to a second frame number. A sum of the first frame number and the second frame number is a video image frame number of the first video, and a video image frame number of the second video is equal to the first frame number.

Based on the foregoing manner, the first video and a second video may be correspondingly synthesized, to generate the final target video.

In this way, when the generated target video is opened and played, simultaneous playback of videos of all image regions can be achieved, duration of the longest first video is used as duration of the final video, and a last frame of picture remains displayed after playback of one or more shorter second videos is completed.

When the time alignment manner is the end alignment, based on the corresponding time sequence, a first frame of video image of the second video is synthesized with each of video image frames of the first video corresponding to a third frame number; and the video image frames of the second video are synthesized in a one-to-one correspondence with video image frames of the first video corresponding to a fourth frame number. A sum of the third frame number and the fourth frame number is the video image frame number of the first video, and the video image frame number of the second video is equal to the fourth frame number.

In this way, when the generated final target video is opened and played, the longest first video may start to be played, a first frame of picture of the shorter second video is displayed for a period of time before the video starts to be played, and videos of all image regions end at a same time point.

When the time alignment manner is the middle alignment, a middle frame of video image of the first video and a middle frame of video image of the second video are obtained and synthesized; based on the corresponding time sequence, the first frame of video image of the second video is synthesized with each of video image frames of the first video corresponding to a fifth frame number; video image frames before the middle frame of video image of the second video is synthesized in a one-to-one correspondence with video image frames of the first video corresponding to a sixth frame number; video image frames after the middle frame of video image of the second video are synthesized in a one-to-one correspondence with video image frames of the first video corresponding to a seventh frame number; and the last frame of video image of the second video is synthesized with each of video image frames of the first video corresponding to an eighth frame number. A sum of the fifth frame number, the sixth frame number, the seventh frame number, the eighth frame number, and the middle frame are the video image frame number of the first video, and the video image frame number of the second video is equal to a sum of the sixth frame number, the seventh frame number, and the middle frame.

In this way, when the generated final target video is opened and played, the videos of all the image regions are aligned based on centers of duration; and other than the longest first video, the first frame of video image of the remaining second video is displayed for a period of time before the video is normally played, and the last frame of video image is displayed for a period of time at the end of the playback until the duration of the first video is reached. In this case, the playback of the videos of all the image regions ends.

When the videos of the image regions are generated based on the alignment manner at any time point, locations of the video image frames of the corresponding videos may be determined based on corresponding set time points, and then the video image frames may be synthesized. The principle is the same as that described above, and details are not described herein again.

Figure 7:
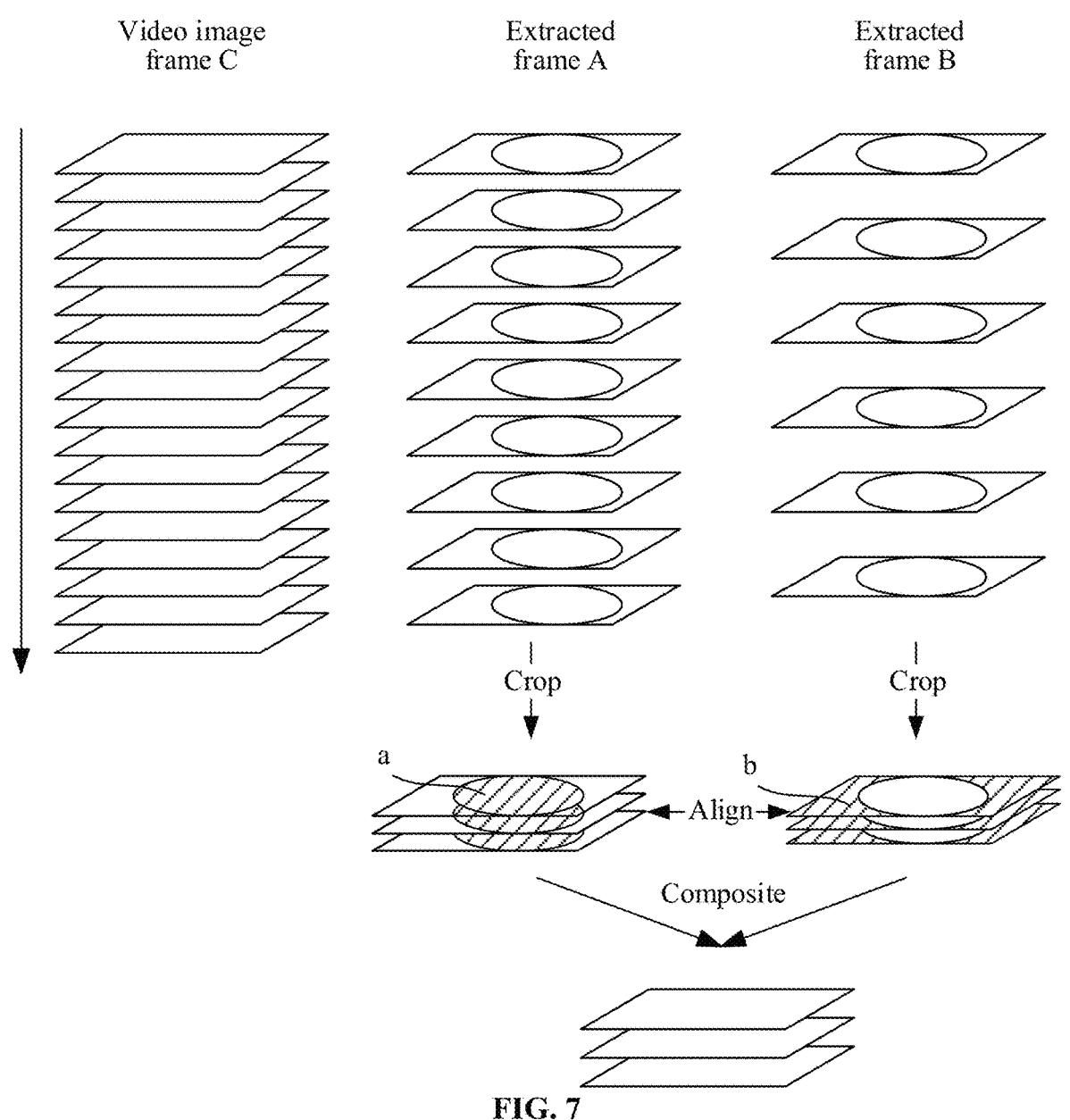
FIG. 7 is a schematic diagram of video creation corresponding to a video recording method according to an embodiment of this application.
Figure 8:
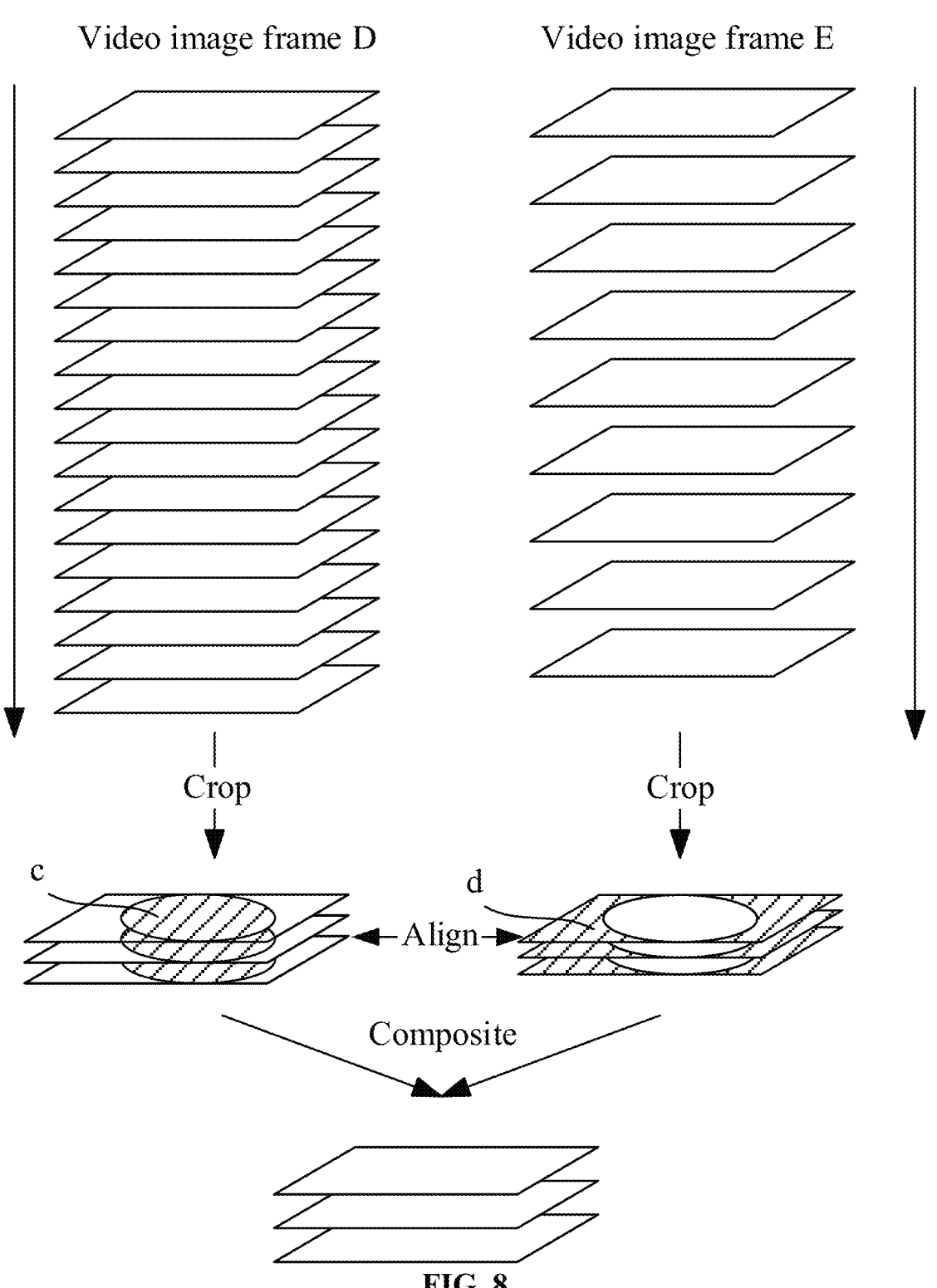
FIG. 8 is a schematic diagram of video creation corresponding to a video recording method according to another embodiment of this application.

FIG. 7 and FIG. 8 are respectively schematic diagrams of video creation corresponding to video recording methods according to two different embodiments of this application. In the embodiment of FIG. 7, recording frame rates corresponding to two image regions are different. In the embodiment of FIG. 8, video recording modes corresponding to two image regions are different.

As shown in FIG. 7, video image frames C recorded and output directly by the image sensor based on a frame rate of an ordinary video are on a leftmost side. After frame extraction is performed on the video image frames C based on a recording frame rate with a time-lapse effect corresponding to an image region, corresponding extracted frames A are obtained; and after frame extraction is performed on the video image frames C based on a recording frame rate with the time-lapse effect corresponding to another image region, corresponding extracted frames B are obtained. Then, the extracted frames A are cropped based on a shape corresponding to the image region, to obtain shaded regions a; and the extracted frames B are cropped based on a shape corresponding to the image region, to obtain shaded regions b. Finally, image shadows a and b of each frame are synthesized based on a preset time alignment manner, to obtain a video image frame of a target video, where two image regions of each frame of video image in the target video present time-lapse video playback effects with different frame rates.

For example, in a video recorded at a frame rate corresponding to 480× speed, an image region indicating sky presents a video playback effect with 480×-speed time-lapse shooting; and in a video recorded at a frame rate corresponding to 30× speed, an image region indicating a road presents a video playback effect with 30×-speed time-lapse shooting.

As shown in FIG. 8, for example, two cameras are included, where on a left side, a first camera shoots a first image region in a slow-motion photography mode, to obtain a video image frame D; and on a right side, a second camera shoots a second image region in a time-lapse photography mode, to obtain a video image frame E. Then, image frames shot by the first camera are cropped based on a shape of the first image region, to obtain shaded regions c; and image frames shot by the second camera are cropped based on a shape of the second image region, to obtain shaded regions d. Finally, image shadows c and d of each frame are synthesized based on a preset time alignment manner, to obtain a video image frame of a target video, where the first image region in the target video presents a video playback effect with slow-motion shooting, and the second image region presents a video playback effect with time-lapse shooting.

In this embodiment of this application, a first input by a user to a shooting preview interface is received; in response to the first input, recording is performed based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and a target video is generated based on the first video and the second video. In this way, pictures of a generated video corresponding to each image region have a different video recording effect. By performing one time video recording, that is, simultaneously implementing video editing and rendering, a demand of the user for recording an interesting video is met, there is no need to perform a plurality of times of video recording with different recording modes or recording parameters for a same field of view, and there is no need for complex post-editing processing. In addition, one time video recording can ensure uniformity of an environment such as lighting, thereby improving a creation rate of a recorded video. Therefore, operational difficulty for the user to create a special effect video is effectively reduced, and interaction experience of the user is improved.

It should be noted that, an execution entity of the video recording method provided in the embodiments of this application may be a video recording apparatus. In this embodiment of this application, an example in which the video recording apparatus executes the video recording method is used to describe the video recording apparatus provided in the embodiments of this application.

Figure 9:
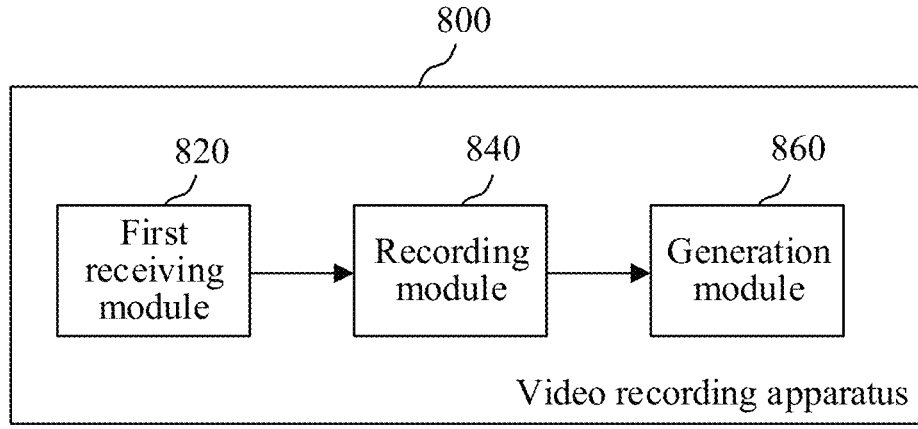
FIG. 9 is a block diagram of a structure of a video recording apparatus according to an embodiment of this application.

According to an embodiment of this application, a video recording apparatus is provided. As shown in FIG. 9, a video recording apparatus 800 includes:

a first receiving module 820, configured to receive a first input by a user to a shooting preview interface;

a recording module 840, configured to perform, in response to the first input, recording based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and a generation module 860, configured to generate a target video based on the first video and the second video.

In this embodiment of this application, a first input by a user to a shooting preview interface is received; in response to the first input, recording is performed based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and a target video is generated based on the first video and the second video. In this way, pictures of a generated video corresponding to each image region have a different video recording effect. By performing one time video recording, that is, simultaneously implementing video editing and rendering, a demand of the user for recording an interesting video is met, there is no need to perform a plurality of times of video recording with different recording modes or recording parameters for a same field of view, and there is no need for complex post-editing processing. In addition, one time video recording can ensure uniformity of an environment such as lighting, thereby improving a creation rate of a recorded video. Therefore, operational difficulty for the user to create a special effect video is effectively reduced, and interaction experience of the user is improved.

Optionally, the video recording apparatus 800 further includes:

a second receiving module, configured to receive a second input by the user to the shooting preview interface before the first receiving module receives the first input by the user to the shooting preview interface; and a determining module, configured to determine, in response to the second input, the first image region and the second image region in the shooting preview interface. Optionally, the second input includes a first sub-input and a second sub-input, and the second receiving module is further configured to receive the first sub-input by the user to a shape control in the shooting preview interface; and the determining module is further configured to display at least one candidate shape in response to the first sub-input; receive the second sub-input by the user to a target candidate shape in the at least one candidate shape; and determine, in response to the second sub-input, the first image region and the second image region based on the target candidate shape.

In this way, by performing division of a plurality of image regions based on the target candidate shape, the user can select a shape most similar to each image region to quickly select a boundary of the image region, to facilitate the user to obtain each image region accurately and quickly.

Optionally, the second receiving module is further configured to receive the second input by the user to a first target object in the shooting preview interface; and the determining module is further configured to determine, in response to the second input, the first image region and the second image region based on an image region of the first target object.

Optionally, after the receiving the second sub-input by the user to a target candidate shape in the at least one candidate shape, the video recording apparatus 800 further includes:

a third receiving module, configured to receive a third input by the user after the second receiving module receives the second sub-input by the user to the target candidate shape in the at least one candidate shape; and a shape display module, configured to display, in response to the third input, the target candidate shape in a target region of the shooting preview interface, where a shape of a target object in the target region is adapted to the target candidate shape.

In this way, the selected shape can be quickly matched to a boundary of the corresponding image region.

Optionally, the video recording apparatus 800 further includes:

a fourth receiving module, configured to receive a fourth input by the user to the target candidate shape after the target candidate shape is displayed in the target region of the shooting preview interface; and a shape update module, configured to update display information of the target candidate shape in response to the fourth input, where the display information includes at least one of the following: location information or size information.

In this way, the determined shape of the image region can be further adjusted based on a manual operation of the user, to achieve more accurate division of the image regions.

Optionally, the video recording apparatus 800 further includes:

a fifth receiving module, configured to receive a fifth input by the user to a first target image region before the first input by the user to the shooting preview interface is received; and a frame rate display module, configured to display a frame rate setting window in response to the fifth input, where the frame rate setting window is for setting a recording frame rate of the first target image region; and the first target image region includes at least one of the following: the first image region or the second image region.

In this way, different image regions of generated video images have local video recording effects with different frame rates, to meet a demand of the user for creating an interesting video. Synchronous recording of local videos with different modes/parameters is implemented, and the videos with the different video recording modes/parameters are used in different regions of generated pictures, so that there is no need for complex post-editing processing.

Optionally, the recording module is further configured to:

control a first camera to acquire a first pre-recorded video; and crop a first target video frame in the first pre-recorded video based on the preset parameters, the first image region, and the second image region, to obtain the first video and the second video, where a video image frame number of the first video is different from a video image frame number of the second video.

In this way, a single camera can be used to simultaneously record a plurality of videos with different frame rates, so that a local video recording effect with a different frame rate is generated, and there is no need for complex post-editing processing, thereby reducing operational difficulty of the user, meeting a demand of the user for recording an interesting video, and improving interaction experience of the user.

Optionally, the video recording apparatus 800 further includes:

a sixth receiving module, configured to receive a sixth input by the user to a second target image region before the first input by the user to the shooting preview interface is received; and a mode display module, configured to display a video recording mode window in response to the sixth input, where the video recording mode window is for setting a video recording mode of the second target image region; and the second target image region includes at least one of the following: the first image region or the second image region.

Optionally, the recording module is further configured to:

control a second camera to acquire a second pre-recorded video in a first video recording mode, and control a third camera to acquire a third pre-recorded video in a second video recording mode;

crop a second target video frame in the second pre-recorded video based on the first image region, to obtain the first video; and crop a third target video frame in the third pre-recorded video based on the second image region, to obtain the second video, where a video image parameter of the first video is different from a video image parameter of the second video.

In this way, by using a feature that an electronic device has a plurality of cameras, video recording in different video recording modes is performed on a plurality of image regions in a same field of view range, to generate in real time that the plurality of image regions in the same field of view range have different video recording effects. The plurality of cameras are used to simultaneously record the plurality of videos with the different video recording modes, so that a local video recording effect with a different video recording mode is generated, and there is no need for complex post-editing processing, thereby reducing operational difficulty of the user, meeting a demand of the user for recording an interesting video, and improving interaction experience of the user.

Optionally, the video recording apparatus 800 further includes:

a seventh receiving module, configured to receive a seventh input by the user to the shooting preview interface before the first input by the user to the shooting preview interface is received; and a first alignment display module, configured to display a first alignment window in response to the seventh input, where the first alignment window is for setting a video image frame alignment manner of the first video and the second video.

Optionally, the video recording apparatus 800 further includes:

a second alignment display module, configured to display a second alignment window before the target video is generated based on the first video and the second video, where the second alignment window includes a first sign and a second sign, the first sign indicates playback duration of the first video, and the second sign indicates playback duration of the second video;

an eighth receiving module, configured to receive an eighth input by the user to a target sign, where the target sign includes at least one of the following: the first sign or the second sign; and a location update module, configured to update, in response to the eighth input, relative location information between the first sign and the second sign, where the relative location information indicates relative playback time of the first video and the second video. In this way, time of a plurality of local recorded videos with different recording effects is aligned, so that a target video with different playback effects can be generated.

In this embodiment of this application, a first input by a user to a shooting preview interface is received; in response to the first input, recording is performed based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and a target video is generated based on the first video and the second video. In this way, pictures of a generated video corresponding to each image region have a different video recording effect. By performing one time video recording, that is, simultaneously implementing video editing and rendering, a demand of the user for recording an interesting video is met, there is no need to perform a plurality of times of video recording with different recording modes or recording parameters for a same field of view, and there is no need for complex post-editing processing. In addition, one time video recording can ensure uniformity of an environment such as lighting, thereby improving a creation rate of a recorded video.

Therefore, operational difficulty for the user to create a special effect video is effectively reduced, and interaction experience of the user is improved.

The video recording apparatus in the embodiments of this application may be an electronic device; or may be a component in an electronic device, such as an integrated circuit or a chip. The electronic device may be a terminal or another device other than the terminal. For example, a mobile electronic device may be a mobile phone, a tablet computer, a notebook computer, a palmtop computer, an in-vehicle electronic device, a mobile Internet device (MID), an augmented reality (AR)/virtual reality (VR) device, a robot, a wearable device, an ultra-mobile personal computer (UMPC), a netbook, a personal digital assistant (PDA), or the like; and may be a server, a network attached memory (NAS), a personal computer (PC), a television (TV), a teller machine, a self-service machine, or the like. This is not specifically limited in the embodiments of this application.

The video recording apparatus in the embodiments of this application may be an apparatus having an operating system. The operating system may be an Android operating system, may be an IOS operating system, or may be another possible operating system. This is not specifically limited in the embodiments of this application.

The video recording apparatus provided in the embodiments of this application can implement processes implemented in the method embodiments of FIG. 1 to FIG. 10, and can achieve the same technical effects. To avoid repetition, details are not described herein again.

Figure 10:
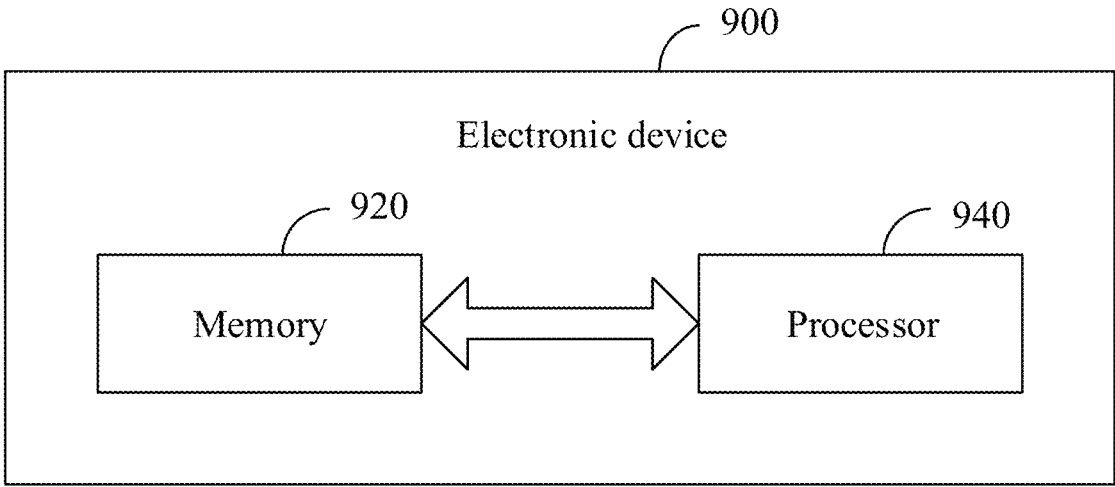
FIG. 10 is a block diagram of a structure of an electronic device according to an embodiment of this application.

Optionally, as shown in FIG. 10, an embodiment of this application further provides an electronic device 900, including a processor 940, a memory 920, and a program or instructions stored on the memory 920 and runnable on the processor 940, where the program or the instructions, when executed by the processor 940, implement all processes of the embodiments of the foregoing video recording method, and can achieve the same technical effects. To avoid repetition, details are not described herein again.

It should be noted that, the electronic device in this embodiment of this application includes the foregoing mobile electronic device and non-mobile electronic device.

Figure 11:
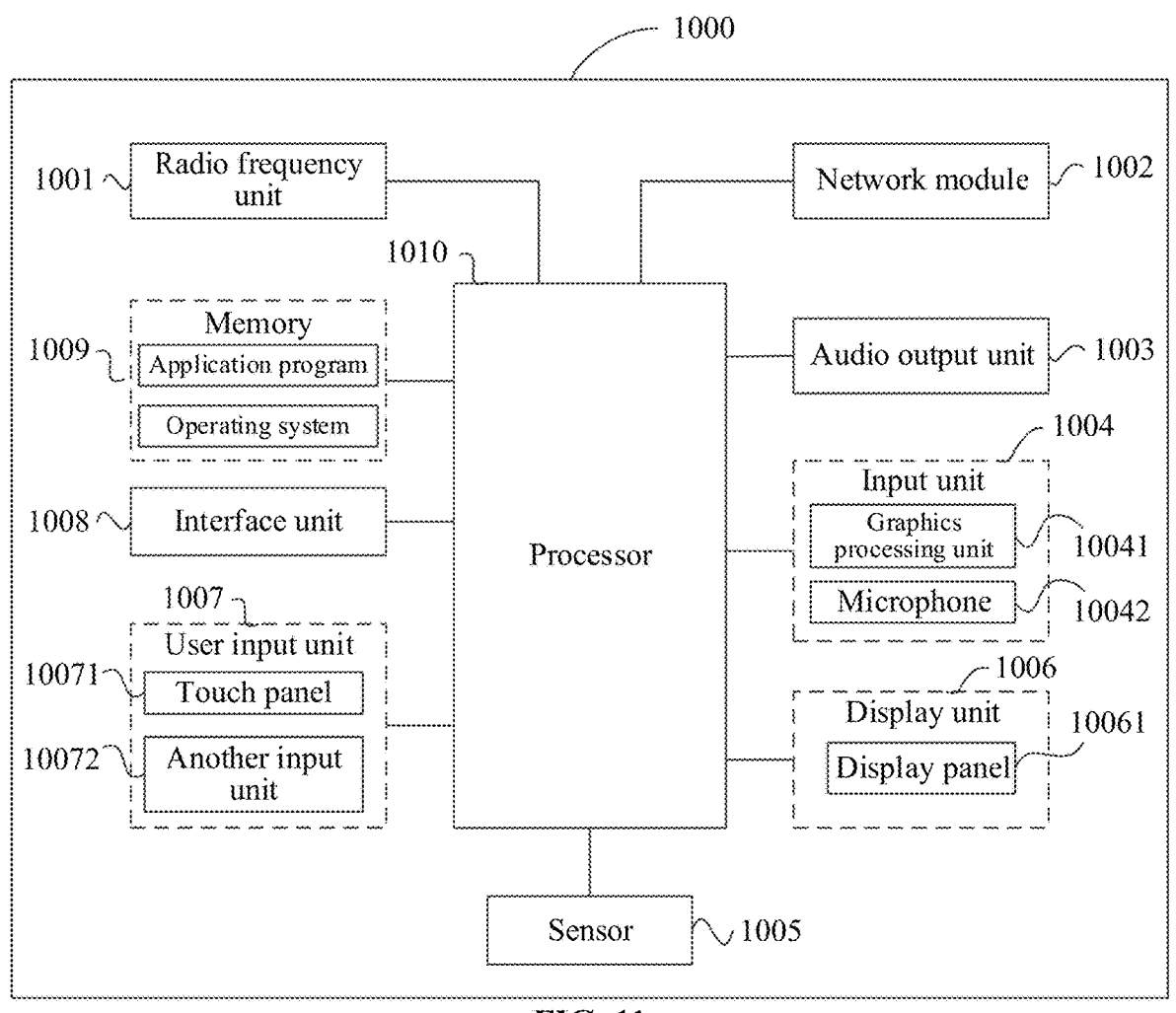
FIG. 11 is a schematic diagram of a hardware structure of an electronic device that implements the embodiments of this application.

FIG. 11 is a schematic diagram of a hardware structure of an electronic device that implements the embodiments of this application.

An electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that the electronic device 1000 further includes a power supply (such as a battery) for supplying power to the components. The power supply may logically connect to the processor 1010 by using a power supply management system, thereby implementing functions, such as charging, discharging, and power consumption management, by using the power supply management system. The structure of the electronic device shown in FIG. 11 constitutes no limitation on the electronic device, and the electronic device may include more or fewer components than those shown in the figure, or some components may be combined, or a different component deployment may be used. Details are not described herein again.

The user input unit 1007 is configured to receive a first input by a user to a shooting preview interface.

The processor 1010 is configured to perform, in response to the first input, recording based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and generate a target video based on the first video and the second video.

A first input by a user to a shooting preview interface is received; in response to the first input, recording is performed based on preset parameters to obtain a first video and a second video, where the first video is a video corresponding to a first image region in the shooting preview interface, the second video is a video corresponding to a second image region in the shooting preview interface, video parameter information of the first video is different from video parameter information of the second video, and the video parameter information includes at least one of the following: a video image frame number or a video image parameter; and a target video is generated based on the first video and the second video. In this way, pictures of a generated video corresponding to each image region have a different video recording effect. By performing one time video recording, that is, simultaneously implementing video editing and rendering, a demand of the user for recording an interesting video is met, there is no need to perform a plurality of times of video recording with different recording modes or recording parameters for a same field of view, and there is no need for complex post-editing processing. In addition, one time video recording can ensure uniformity of an environment such as lighting, thereby improving a creation rate of a recorded video. Therefore, operational difficulty for the user to create a special effect video is effectively reduced, and interaction experience of the user is improved.

Optionally, the user input unit 1007 is further configured to receive a second input by the user to the shooting preview interface before the first input by the user to the shooting preview interface is received.

The processor 1010 is further configured to determine, in response to the second input, the first image region and the second image region in the shooting preview interface.

Optionally, the user input unit 1007 is further configured to receive a first sub-input by the user to a shape control in the shooting preview interface.

The processor 1010 is further configured to display at least one candidate shape in response to the first sub-input.

The user input unit 1007 is further configured to receive a second sub-input by the user to a target candidate shape in the at least one candidate shape.

The processor 1010 is further configured to determine, in response to the second sub-input, the first image region and the second image region based on the target candidate shape.

In this way, by performing division of a plurality of image regions based on the target candidate shape, the user can select a shape most similar to each image region to quickly select a boundary of the image region, to facilitate the user to obtain each image region accurately and quickly.

Optionally, the user input unit 1007 is further configured to receive the second input by the user to a first target object in the shooting preview interface.

The processor 1010 is further configured to determine, in response to the second input, the first image region and the second image region based on an image region of the first target object.

Optionally, the user input unit 1007 is further configured to receive a third input by the user after the second sub-input by the user to the target candidate shape in the at least one candidate shape is received.

The display unit 1006 is configured to display, in response to the third input, the target candidate shape in a target region of the shooting preview interface, where a shape of a target object in the target region is adapted to the target candidate shape.

In this way, the selected shape can be quickly matched to a boundary of the corresponding image region.

Optionally, the user input unit 1007 is further configured to receive a fourth input by the user to the target candidate shape after the target candidate shape is displayed in the target region of the shooting preview interface.

The processor 1010 is further configured to update display information of the target candidate shape in response to the fourth input, where the display information includes at least one of the following: location information or size information.

In this way, the determined shape of the image region can be further adjusted based on a manual operation of the user, to achieve more accurate division of the image regions.

Optionally, the user input unit 1007 is further configured to receive a fifth input by the user to a first target image region before the first input by the user to the shooting preview interface is received.

The processor 1010 is further configured to display a frame rate setting window in response to the fifth input, where the frame rate setting window is for setting a recording frame rate of the first target image region; and the first target image region includes at least one of the following: the first image region or the second image region.

In this way, different image regions of generated video images have local video recording effects with different frame rates, to meet a demand of the user for creating an interesting video. Synchronous recording of local videos with different modes/parameters is implemented, and the videos with the different video recording modes/parameters are used in different regions of generated pictures, so that there is no need for complex post-editing processing.

Optionally, the processor 1010 is further configured to:

control a first camera to acquire a first pre-recorded video; and crop a first target video frame in the first pre-recorded video based on the preset parameters, the first image region, and the second image region, to obtain the first video and the second video, where a video image frame number of the first video is different from a video image frame number of the second video.

In this way, a single camera can be used to simultaneously record a plurality of videos with different frame rates, so that a local video recording effect with a different frame rate is generated, and there is no need for complex post-editing processing, thereby reducing operational difficulty of the user, meeting a demand of the user for recording an interesting video, and improving interaction experience of the user.

Optionally, the user input unit 1007 is further configured to receive a sixth input by the user to a second target image region before the first input by the user to the shooting preview interface is received.

The processor 1010 is further configured to display a video recording mode window in response to the sixth input, where the video recording mode window is for setting a video recording mode of the second target image region; and the second target image region includes at least one of the following: the first image region or the second image region.

Optionally, the processor 1010 is further configured to:

control a second camera to acquire a second pre-recorded video in a first video recording mode, and control a third camera to acquire a third pre-recorded video in a second video recording mode;

crop a second target video frame in the second pre-recorded video based on the first image region, to obtain the first video; and crop a third target video frame in the third pre-recorded video based on the second image region, to obtain the second video, where a video image parameter of the first video is different from a video image parameter of the second video.

In this way, by using a feature that an electronic device has a plurality of cameras, video recording in different video recording modes is performed on a plurality of image regions in a same field of view range, to generate in real time that the plurality of image regions in the same field of view range have different video recording effects. The plurality of cameras are used to simultaneously record the plurality of videos with the different video recording modes, so that a local video recording effect with a different video recording mode is generated, and there is no need for complex post-editing processing, thereby reducing operational difficulty of the user, meeting a demand of the user for recording an interesting video, and improving interaction experience of the user.

Optionally, the user input unit 1007 is further configured to receive a seventh input by the user to the shooting preview interface before the first input by the user to the shooting preview interface is received; and The processor 1010 is further configured to display a first alignment window in response to the seventh input, where the first alignment window is for setting a video image frame alignment manner of the first video and the second video.

Optionally, the display unit 1006 is further configured to display a second alignment window before the target video is generated based on the first video and the second video, where the second alignment window includes a first sign and a second sign, the first sign indicates playback duration of the first video, and the second sign indicates playback duration of the second video.

The user input unit 1007 is further configured to receive an eighth input by the user to a target sign, where the target sign includes at least one of the following: the first sign or the second sign.

The processor 1010 is further configured to update, in response to the eighth input, relative location information between the first sign and the second sign, where the relative location information indicates relative playback time of the first video and the second video.

In this way, time of a plurality of local recorded videos with different recording effects is aligned, so that a target video with different playback effects can be generated. It should be understood that, in this embodiment of this application, the input unit 1004 may include a graphics processing unit (GPU) 10041 and a microphone 10042. The graphics processing unit 10041 processes image data of a still picture or a video obtained by an image capture apparatus (such as a camera) in a video capture mode or an image capture mode. The display unit 1006 may include a display panel 10061, for example, the display panel 10061 may be configured in a form such as a liquid crystal display or an organic light-emitting diode. The user input unit 1007 includes at least one of a touch panel 10071 or another input device 10072. The touch panel 10071 is also referred to as a touchscreen. The touch panel 10071 may include a touch detection apparatus and a touch controller. The another input device 10072 may include, but is not limited to, a physical keyboard, a function key (such as a volume control key, a switch key, or the like), a trackball, a mouse, and an operating lever, which is not described in detail herein.

The memory 1009 may be configured to store a software program and various data. The memory 1009 may mainly include a first storage region for storing the program or the instructions and a second storage region for storing data, where the first storage region may store an operating system, an application program or instructions required for at least one function (for example, a sound playing function and an image playing function), or the like. In addition, the memory 1009 may include a volatile memory or a non-volatile memory, or the memory 1009 may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), or a direct rambus random access memory (DR RAM). The memory 1009 in this embodiment of this application includes but is not limited to these memories and any other suitable types of memories.

The processor 1010 may include one or more processing units. Optionally, the processor 1010 integrates an application processor and a modem. The application processor mainly processes operations related to an operating system, a user interface, an application program, and the like. The modem mainly processes a wireless communication signal, such as a baseband processor. It may be understood that, the foregoing modem may not be integrated into the processor 1010.

An embodiment of this application further provides a readable storage medium, storing a program or instructions. The program or the instructions, when executed by a processor, implement processes of the embodiments of the foregoing video recording method, and can achieve the same technical effects. To avoid repetition, details are not described herein again.

The processor is the processor in the foregoing electronic device in the foregoing embodiments. The readable storage medium includes a computer-readable storage medium, for example, a computer read-only memory (ROM), a random access memory (RAM), a magnetic disk, or an optical disc.

An embodiment of this application further provides a chip, including a processor and a communication interface, where the communication interface is coupled to the processor, and the processor is configured to run a program or instructions, to implement processes of the embodiments of the foregoing video recording method, and can achieve the same technical effects. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program product, stored in a storage medium. The program product is executed by at least one processor to implement processes of the embodiments of the foregoing video recording method, and can achieve the same technical effects. To avoid repetition, details are not described herein again.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, a feature described with reference to an example may be combined in another example.

Through the descriptions of the foregoing implementations, a person skilled in the art may clearly understand that the method according to the foregoing embodiments may be implemented through software and a necessary general hardware platform, and certainly, may alternatively be implemented by hardware, but in many cases, the former manner is a better implementation. Based on such an understanding, the technical solutions in this application essentially or the part contributing to the existing technologies may be implemented in the form of a software product. The computer software product is stored in a storage medium (for example, a read-only memory (ROM)/random access memory (RAM), a magnetic disk or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A video recording method, comprising:
receiving a first input by a user to a shooting preview interface;
performing, in response to the first input, recording based on preset parameters to obtain a first video and a second video, wherein the first video is a video corresponding to a first image region in the shooting preview interface, the second video is a video corresponding to a second image region in the shooting preview interface, video parameter information of the first video is different from video parameter information of the second video, and the video parameter information comprises at least one of the following:

a video image frame number or a video image parameter; and generating a target video based on the first video and the second video-;

wherein before the receiving a first input by a user to a shooting preview interface, the method further comprises:

receiving a second input by the user to the shooting preview interface; and determining, in response to the second input, the first image region and the second image region in the shooting preview interface;

wherein the second input comprises a first sub-input to a shape control in the shooting preview interface and a second sub-input to a target candidate shape in at least one candidate shape, or the second input comprises an input to a first target object in the shooting preview interface.

2. The method according to claim 1, wherein the second input comprises the first sub-input and the second sub-input, and the receiving a second input by the user to the shooting preview interface comprises:

receiving the first sub-input by the user to the shape control in the shooting preview interface; and the determining, in response to the second input, the first image region and the second image region in the shooting preview interface comprises:

displaying the at least one candidate shape in response to the first sub-input;

receiving the second sub-input by the user to the target candidate shape in the at least one candidate shape; and determining, in response to the second sub-input, the first image region and the second image region based on the target candidate shape.

3. The method according to claim 2, wherein after the receiving the second sub-input by the user to a target candidate shape in the at least one candidate shape, the method further comprises:

receiving a third input by the user; and displaying, in response to the third input, the target candidate shape in a target region of the shooting preview interface, wherein a shape of a target object in the target region is adapted to the target candidate shape.

4. The method according to claim 3, wherein after displaying the target candidate shape in a target region of the shooting preview interface, the method further comprises:

receiving a fourth input by the user to the target candidate shape; and updating display information of the target candidate shape in response to the fourth input, wherein the display information comprises at least one of the following: location information or size information.

5. The method according to claim 1, wherein the receiving a second input by the user to the shooting preview interface comprises:

receiving the second input by the user to the first target object in the shooting preview interface; and the determining, in response to the second input, the first image region and the second image region in the shooting preview interface comprises:

determining, in response to the second input, the first image region and the second image region based on an image region of the first target object.

6. The method according to claim 1, wherein before the receiving a first input by a user to a shooting preview interface, the method further comprises:

receiving a fifth input by the user to a first target image region; and displaying a frame rate setting window in response to the fifth input, wherein the frame rate setting window is for setting a recording frame rate of the first target image region; and the first target image region comprises at least one of the following: the first image region or the second image region.

7. The method according to claim 1, wherein the performing recording based on preset parameters to obtain a first video and a second video comprises:

controlling a first camera to acquire a first pre-recorded video; and cropping a first target video frame in the first pre-recorded video based on the preset parameters, the first image region, and the second image region, to obtain the first video and the second video, wherein a video image frame number of the first video is different from a video image frame number of the second video.

8. The method according to claim 1, wherein before the receiving a first input by a user to a shooting preview interface, the method further comprises:

receiving a sixth input by the user to a second target image region; and displaying a video recording mode window in response to the sixth input, wherein the video recording mode window is for setting a video recording mode of the second target image region; and the second target image region comprises at least one of the following: the first image region or the second image region.

9. The method according to claim 8, wherein the performing recording based on preset parameters to obtain a first video and a second video comprises:

controlling a second camera to acquire a second pre-recorded video in a first video recording mode, and controlling a third camera to acquire a third pre-recorded video in a second video recording mode;

cropping a second target video frame in the second pre-recorded video based on the first image region, to obtain the first video; and cropping a third target video frame in the third pre-recorded video based on the second image region, to obtain the second video, wherein a video image parameter of the first video is different from a video image parameter of the second video.

10. The method according to claim 1, wherein before the receiving a first input by a user to a shooting preview interface, the method further comprises:

receiving a seventh input by the user to the shooting preview interface; and displaying a first alignment window in response to the seventh input, wherein the first alignment window is for setting a video image frame alignment manner of the first video and the second video.

11. The method according to claim 1, wherein before the generating a target video based on the first video and the second video, the method further comprises:

displaying a second alignment window, wherein the second alignment window comprises a first sign and a second sign, the first sign indicates playback duration of the first video, and the second sign indicates playback duration of the second video;

receiving an eighth input by the user to a target sign, wherein the target sign comprises at least one of the following: the first sign or the second sign; and updating, in response to the eighth input, relative location information between the first sign and the second sign, wherein the relative location information indicates relative playback time of the first video and the second video.

12. A chip, comprising a processor and a communication interface, wherein the communication interface is coupled to the processor, and the processor is configured to run a program or instructions, to implement steps of the video recording method according to claim 1.

13. A computer program product, stored in a storage medium, wherein the program product, when executed by at least one processor, implements steps of the video recording method according to claim 1.

14. An electronic device, comprising a processor, a memory, and a program or instructions stored on the memory and runnable on the processor, wherein the program or the instructions, when executed by the processor, cause the electronic device to perform:

receiving a first input by a user to a shooting preview interface;

performing, in response to the first input, recording based on preset parameters to obtain a first video and a second video, wherein the first video is a video corresponding to a first image region in the shooting preview interface, the second video is a video corresponding to a second image region in the shooting preview interface, video parameter information of the first video is different from video parameter information of the second video, and the video parameter information comprises at least one of the following:

a video image frame number or a video image parameter; and generating a target video based on the first video and the second video-;

wherein before the receiving a first input by a user to a shooting preview interface, the program or the instructions, when executed by the processor, cause the electronic device to further perform:

receiving a second input by the user to the shooting preview interface; and determining, in response to the second input, the first image region and the second image region in the shooting preview interface;

wherein the second input comprises a first sub-input to a shape control in the shooting preview interface and a second sub-input to a target candidate shape in at least one candidate shape, or the second input comprises an input to a first target object in the shooting preview interface.

15. The electronic device according to claim 14, wherein the second input comprises the first sub-input and the second sub-input, wherein when receiving a second input by the user to the shooting preview interface, the program or the instructions, when executed by the processor, cause the electronic device to perform:

receiving the first sub-input by the user to the shape control in the shooting preview interface; and when determining, in response to the second input, the first image region and the second image region in the shooting preview interface, the program or the instructions, when executed by the processor, cause the electronic device to perform:

displaying the at least one candidate shape in response to the first sub-input;

receiving the second sub-input by the user to the target candidate shape in the at least one candidate shape; and determining, in response to the second sub-input, the first image region and the second image region based on the target candidate shape.

16. The electronic device according to claim 15, wherein after the receiving the second sub-input by the user to a target candidate shape in the at least one candidate shape, the program or the instructions, when executed by the processor, cause the electronic device to further perform:

receiving a third input by the user; and displaying, in response to the third input, the target candidate shape in a target region of the shooting preview interface, wherein a shape of a target object in the target region is adapted to the target candidate shape.

17. The electronic device according to claim 14, wherein when receiving a second input by the user to the shooting preview interface, the program or the instructions, when executed by the processor, cause the electronic device to perform:

receiving the second input by the user to the first target object in the shooting preview interface; and when determining, in response to the second input, the first image region and the second image region in the shooting preview interface, the program or the instructions, when executed by the processor, cause the electronic device to perform:

determining, in response to the second input, the first image region and the second image region based on an image region of the first target object.

18. A non-transitory readable storage medium, storing a program or instructions, wherein the program or the instructions, when executed by a processor of an electronic device, cause the electronic device to perform:

receiving a first input by a user to a shooting preview interface;

performing, in response to the first input, recording based on preset parameters to obtain a first video and a second video, wherein the first video is a video corresponding to a first image region in the shooting preview interface, the second video is a video corresponding to a second image region in the shooting preview interface, video parameter information of the first video is different from video parameter information of the second video, and the video parameter information comprises at least one of the following:

a video image frame number or a video image parameter; and generating a target video based on the first video and the second video;

wherein before the receiving a first input by a user to a shooting preview interface, the program or the instructions, when executed by the processor, cause the electronic device to further perform:

receiving a second input by the user to the shooting preview interface; and determining, in response to the second input, the first image region and the second image region in the shooting preview interface;

wherein the second input comprises a first sub-input to a shape control in the shooting preview interface and a second sub-input to a target candidate shape in at least one candidate shape, or the second input comprises an input to a first target object in the shooting preview interface.

* * * * *